Oct. 14, 1941.  V. F. GREAVES  2,258,983

PROGRESSIVE SEPARATOR

Filed May 13, 1940

INVENTOR
Valentine F. Greaves
BY Paul O. Flehr
ATTORNEY

Patented Oct. 14, 1941

2,258,983

UNITED STATES PATENT OFFICE 2,258,983

PROGRESSIVE SEPARATOR

Valentine F. Greaves, Oakland, Calif.

Application May 13, 1940, Serial No. 334,861

8 Claims. (Cl. 312—92)

This invention relates to equipment for use in the storage and handling of material such as a series of projection slides having a prearranged sequence, and is concerned more particularly with the provision of improved progressive separator equipment whereby the individual slides of a series can be progressively selected and elevated for removal during projection and can be readily returned after use to their proper place in the original sequence.

It is an object of the invention to provide improved progressive separating equipment for a series of projection slides in which the next slide to be projected can be lifted from the series at the time the last slide projected is returned to the series in its correct sequence.

Other objects and advantages of the invention will be apparent from the following description of certain preferred embodiments thereof, as illustrated in the accompanying drawing in which.

In accordance with the instant invention, the progressive separating apparatus may include a box construction having means for holding a series of projection slides in elevated position with reference to the bottom of the box, and having a pick-up type of progressive separator adapted for use in row formation in the series of slides and provided with means for picking up successive slides to be projected and for providing a guide for the return of used slides to the group of slides which have been projected.

Figure 2:
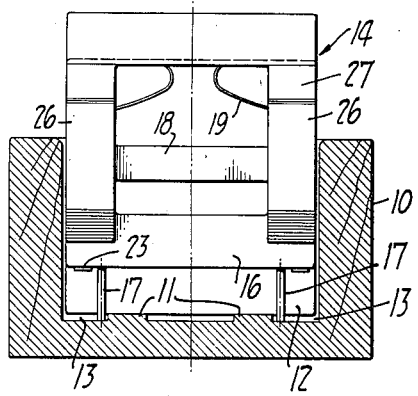
Figure 2 is a transverse sectional elevation of the progressive separating apparatus taken in a plane indicated by the line 2—2 of Figure 1.
Figure 1:
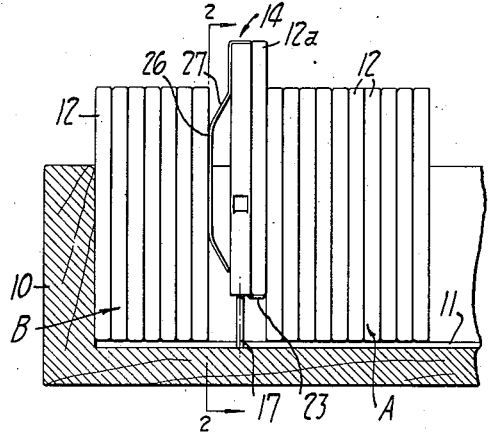
Figure 1 is a fragmentary sectional view of a slide-holding box with a progressive separator and elevator installed in operative relation with a series of slides.

Referring to Figures 1 and 2, a rectangular container or box 10 is shown having a pair of longitudinal rails 11 which may be formed integrally in the box or by means of a suitable insert to fit in the box. The rails 11 serve to support a series of projection slides 12 of conventional construction in elevated position with reference to the bottom of the box to provide a space 13 between the bottom of the slide and the box at either end of the respective slides.

To provide for sequential selection and removal of the slides 12 from the box and to enable return thereof in the correct sequence, a progressive separator is provided as indicated generally at 14 which serves to separate the slides 12 into a group A of slides to be projected and a group B of projected slides. The separator 14 comprises a box-like casing 16 which is supported in elevated position from the bottom of the box by means of a pair of feet 17 carried by a bar 18 slidably disposed for vertical telescoping movement within the casing 16. The casing 16 and the bar and foot construction form telescoping sections of the separator which are urged toward their extended position shown by means of a leaf spring 19 which is suitably disposed within the casing 16 and has its ends seated in recessed portions 21 of the bar 18. The projected position of the feet 17 is controlled by means of stop ears 22 turned in from a wall of the casing 16 and lying in the path of the bar 18.

Figure 3:
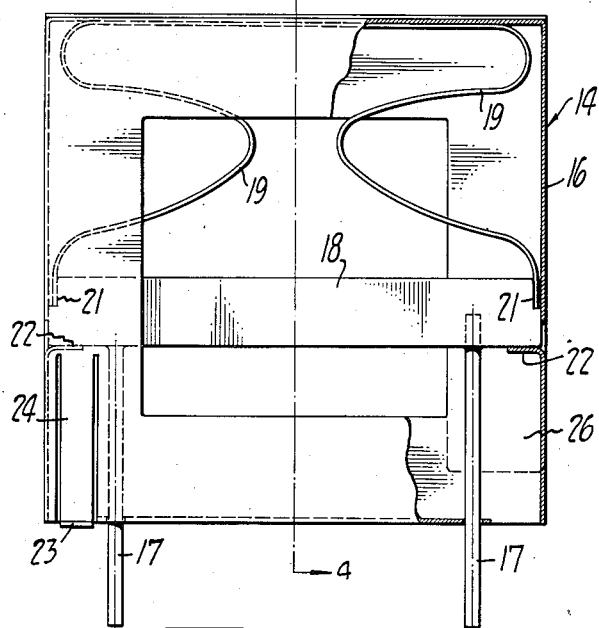
Figure 3 is an enlarged view of a progressive separator with certain parts broken away to illustrate details of the construction.
Figure 4:
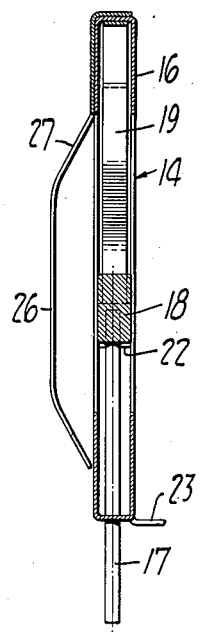
Figure 4 is a sectional view of the separator taken in a plane indicated by the line 4—4 in Figure 3.

From the above description it is seen that the casing 16 can be telescoped downwardly with reference to the feet 17 by pressure on the top of the casing, accompanied by compression of the spring 19, which upon release of the pressure will serve to restore the casing 16 to the position shown in Figure 1 for example. To enable pick-up of the next adjacent slide of the group A, the casing 16 is provided with a pair of similar laterally projecting fingers 23 adjacent its lower edge which are formed at the bottom of cut-out spring sections 24 (Figure 3) of the casing. The construction is such that the fingers 23 can recede into the casing upon lateral pressure, but when the casing is depressed sufficiently for the fingers 23 to enter the respective spaces 13, the fingers 23 will snap under the next adjacent slide 12 of the group A. Upon release of the casing, the fingers 23 will lift the adjacent slide as indicated at 12a in Figure 1 where it can be grasped by the operator and removed for projection.

In order to provide for return of projected slides to the series in the correct sequence, the casing 16 is provided with a pair of formed strips 26 adjacent the group of projected slides B which are spaced from the adjacent wall of the casing intermediate their ends, and have inclined portions 27 adjacent their upper ends which are divergent upwardly with reference to the adjacent slide 12 of the group B and provide a guide for return of a projected slide in the correct sequence.

In operation, the series of slides 12 are installed in the box 10 with sufficient looseness to accommodate the progressive separator 14 which at the beginning of the projection operation is installed in the left end of the box as viewed in Figure 1.

The separator 14 would then be manually depressed to cause the casing 16 to lower until the fingers 23 snap beneath the first slide 12 to elevate the slide upon release of the casing 16 by the operation of the compression spring 19. The operator can then remove the slide for projection and after such projection will return it to the left hand slide of the separator 14 against the guide surface 27. At the same time that the slide is placed in the group B, the separator 14 can again be operated to lift the next slide of the group A so that in one motion the operator can return a used slide and remove the next slide for projection. The above operation is continued in sequence until the separator has been progressed through the entire series of slides which are successively lifted, projected, and then returned by engagement with the guide surface 27.

Figure 5:
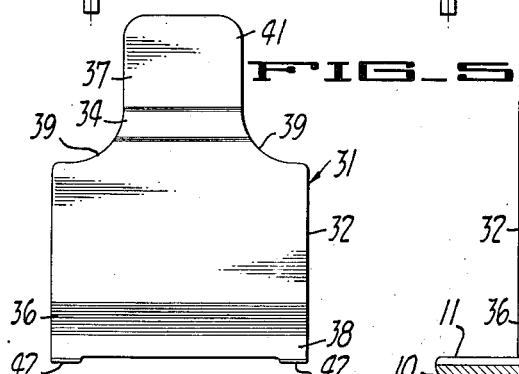
Figure 5 is an elevational view of a modified form of progressive separator.
Figure 6:
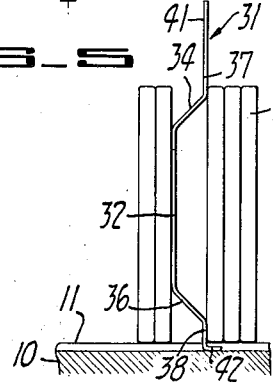
Figure 6 is a fragmentary sectional elevation of the separator shown in Figure 5 in place in a series of projection slides.

The progressive separator shown in Figures 5 and 6 is adapted for use with the box construction shown at 10 in Figures 1 and 2 including the raised rails 11 for holding the slides in elevated position. The separator indicated generally at 31 may be formed from a metal blank or plate 32 to provide a central offset wall 33 which is connected by inclined portions 34 and 36 with respective upper and lower sectional wall portions 37 and 38 spaced laterally from the middle wall portion 33. Wall 33 is for engagement with the adjacent slide of group B while the sectional wall portions 37 and 38 engage the adjacent slide of group A. At its upper end the separator is provided with cut-away portions 39, which provide a reduced width at its upper end and form a handle 41 while at the same time exposing the respective upper corners of the adjacent slide 12 of the group A for manual pick-up by the operator.

At either end thereof the lower wall section 38 is provided with respective lateral extensions 42 to form a pair of fingers having a length substantially equal to the thickness of one slide 12. When the separator 31 is fully seated in the box, the fingers 42 are seated in the spaces 13 and can be engaged beneath the next adjacent slide 12 of the group A either manually or by return of a slide to the group B. The upper inclined wall portion 34 provides a guide for return of a projected slide to the group B in the correct sequence.

In operation, when a slide is returned to the group B, the operator lifts the separator 31 by means of its handle 41 and thereby also lifts the next adjacent slide 12 of the group A into position where it can be grasped by the hand which also accomplished the lifting of the separator. Upon release of the separator it will fall to its seated position while the fingers 42 will be disposed for engagement with the next adjacent slide 12 of the group A whereby these slides can be successively removed, projected, and then returned to the group B.

I claim:

1. A progressive separator for use with a series of projection slides having a pre-arranged sequence and a container for said series of slides having means for maintaining said slides elevated from the bottom thereof, said separator being adapted for disposition in said container to separate the series of slides into one group which are to be projected and another group which have been projected, said separator having means projecting toward the group of to be projected slides and adapted for movement beneath the next adjacent slide of said one group to lift said slide into accessible position for easy removal for projection.

2. A progressive separator for use with a series of projection slides having a pre-arranged sequence and a container for said series of slides, said separator being adapted for disposition in said container to separate the series of slides into one group which are to be projected and another group which have been projected, said separator having finger means projecting toward a group of to be projected slides and adapted for movement into lifting engagement with the next adjacent slides of said one group to lift said slide into accessible position for easy removal for projection.

3. A progressive separator for use with a series of projection slides having a pre-arranged sequence and a container for said series of slides having means for maintaining said slides elevated from the bottom thereof, said separator being adapted for disposition in said container to separate the series of slides into one group which are to be projected and another group which have been projected, said separator having at least one finger projecting toward a group of to be projected slides and adapted for movement beneath the next adjacent slide of said one group to lift said slide into accessible position for easy removal for projection, and said separator having one side surface inclined at its upper portion to provide a guide opening leading to the group of projected slides for return of projected slides thereto in the proper sequence.

4. A progressive separator for use with a series of projection slides having a pre-arranged sequence and a container for said series of slides, said separator being adapted for disposition in said container to separate the series of slides into one group which are to be projected and another group which have been projected, said separator having at least one finger projecting toward the group of to be projected slides and adapted for movement into lifting engagement with the next adjacent slide of said one group to engage and lift said slide into accessible position for easy removal for projection, and said separator having one side surface inclined at its upper portion to provide a guide opening leading to the group of projected slides for return of projected slides thereto in proper sequence.

5. A progressive separator for use with a series of projection slides having a pre-arranged sequence and a container for said series of slides, having means for maintaining said slides elevated from the bottom thereof, said separator being adapted for disposition in said container to separate the series of slides into one group which are to be projected and another group which have been projected, said separator comprising vertically disposed telescoping sections and spring means urging said sections apart, said upper section carrying finger means adapted for lifting engagement with the next adjacent slide of said one group upon depression and release of said upper section.

6. A progressive separator for use with a series of projection slides having a pre-arranged sequence and a container for said series of slides having means for maintaining said slides elevated from the bottom thereof, said separator being adapted for disposition in said conainer to separate the series of slides into one group which are to be projected and another group which have been projected, said separator comprising vertically disposed telescoping sections and spring means urging said sections apart, said upper section carrying finger means adapted for lifting engagement with the next adjacent slide of said one group upon depression and release of said upper section and said separator having an inclined guide surface facing said group of projected slides to enable return of a slide after projection to said group of projected slides.

7. A progressive separator for use with a series of projection slides having a pre-arranged sequence and a container for said series of slides having means for maintaining said slides elevated from the bottom thereof, said separator being adapted for disposition in said container to separate the series of slides into one group which are to be projected and another group which have been projected, said separator having laterally spaced wall portions for engagement with said respective groups, a wall portion adjacent said one group carrying finger means for lifting engagement with the next slide of said one group, and a wall portion adjacent said another group providing an inclined guide surface for return of slides thereto, said separator also having a handle projecting above said slides.

8. A progressive separator for use with a series of projection slides having a pre-arranged sequence and a container for said series of slides having means for maintaining said slides elevated from the bottom thereof, said separator being adapted for disposition in said container to separate the series of slides into one group which are to be projected and another group which have been projected, said separator being integrally formed of sheet material to provide vertically spaced-apart wall portions for engaging said one group and an intermediate wall portion laterally offset from said spaced-apart wall portions and joined thereto by inclined wall portions, the upper inclined wall portion being in the region of the tops of the slides and disposed to form a guide for return of individual projected slides to said another group in their original sequence, said separator having at least one finger for lifting engagement with the next adjacent slide of said one group and being cutaway at its upper end to provide access to a slide supported on said separator, the cut-away end of said separator also providing a handle projecting above the slides.

VALENTINE F. GREAVES.